(12) United States Patent
Park et al.

(10) Patent No.: US 9,626,029 B2
(45) Date of Patent: Apr. 18, 2017

(54) ELECTRONIC DEVICE AND METHOD OF CONTROLLING ELECTRONIC DEVICE USING GRIP SENSING

(71) Applicant: Samsung Electronics Co., Ltd., Gyeonggi-do (KR)

(72) Inventors: Ju-Wan Park, Gyeonggi-do (KR); Myung-Sik Kim, Gyeonggi-do (KR); Joon-Oo Kim, Gyeonggi-do (KR); Sun-Ah Kim, Gyeonggi-do (KR); Yun-Je Oh, Gyeonggi-do (KR); Sun-Tae Jung, Gyeonggi-do (KR); Hyun-Su Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/310,860

(22) Filed: Jun. 20, 2014

(65) Prior Publication Data

US 2014/0375582 A1    Dec. 25, 2014

(30) Foreign Application Priority Data

Jun. 20, 2013  (KR) .................. 10-2013-0071037
Oct. 25, 2013  (KR) .................. 10-2013-0128151

(51) Int. Cl.
  *G06F 3/041*     (2006.01)
  *G06F 1/16*      (2006.01)
  *G09G 5/37*      (2006.01)

(52) U.S. Cl.
  CPC ............ *G06F 3/0414* (2013.01); *G06F 1/169* (2013.01); *G06F 1/1694* (2013.01); *G09G 5/37* (2013.01); *G06F 2200/1637* (2013.01)

(58) Field of Classification Search
  None
  See application file for complete search history.

(56) References Cited

U.S. PATENT DOCUMENTS

| 8,493,342  | B2 * | 7/2013 | Park et al. ................... 345/173 |
| 8,823,663  | B2 * | 9/2014 | Ryu ...................... G06F 1/1632 345/156 |
| 9,035,905  | B2 * | 5/2015 | Saukko ................ G06F 1/1684 345/156 |
| 2007/0002016 | A1 | 1/2007 | Cho et al. |

FOREIGN PATENT DOCUMENTS

| EP | 2 175 344     | 4/2010 |
| EP | 2 573 669     | 3/2013 |
| KR | 1020070001440 | 1/2007 |
| KR | 1020090025001 | 3/2009 |
| KR | 1020100027660 | 3/2010 |
| KR | 1020100042833 | 4/2010 |
| KR | 1020110068666 | 6/2011 |
| KR | 1020110138743 | 12/2011 |

OTHER PUBLICATIONS

European Search Report dated Oct. 15, 2014 issued in counterpart application No. 14172405.4-1959.
European Search Report dated Mar. 3, 2017 issued in counterpart application No. 14172405.4-1879, 6 pages.

* cited by examiner

*Primary Examiner* — Kenneth B Lee, Jr.
(74) *Attorney, Agent, or Firm* — The Farrell Law Firm, P.C

(57) ABSTRACT

An electronic device is provided. The device includes a touch sensor configured to sense at least one touch; a pressure sensor configured to sense at least one pressure; and a controller configured to sense a grip pattern on the electronic device using the touch sensor and the pressure sensor, and to control a predetermined function according to the grip pattern.

21 Claims, 14 Drawing Sheets

------- GRIP PATTERN

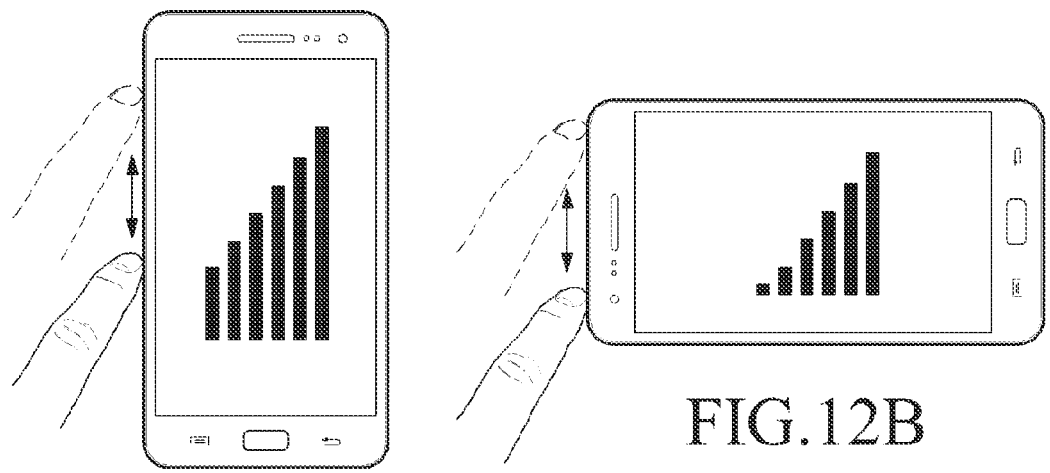
FIG.12A
FIG.12B
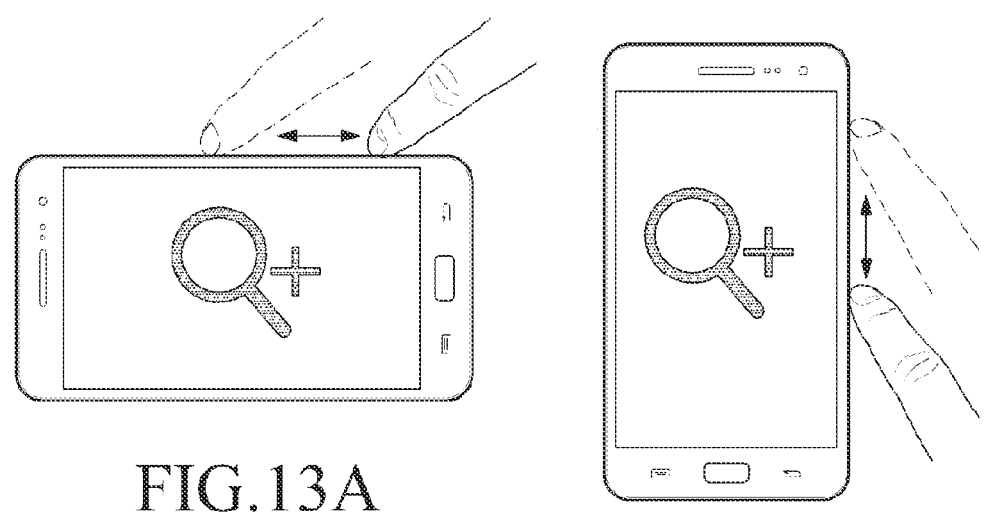
FIG.13A
FIG.13B

--- GRIP PATTERN

----- GRIP PATTERN

ELECTRONIC DEVICE AND METHOD OF CONTROLLING ELECTRONIC DEVICE USING GRIP SENSING

PRIORITY

This application claims priority under 35 U.S.C. §119(a) to Korean Patent Applications filed in the Korean Intellectual Property Office on Jun. 20, 2013 and assigned Serial No. 10-2013-0071039, and on Oct. 25, 2013 and assigned Serial No. 10-2013-0128151, the entire contents of both of which are incorporated herein by reference.

BACKGROUND

1. Field of the Invention

The present disclosure relates generally to an electronic device, and a method of controlling an electronic device using grip sensing.

2. Description of the Related Art

Lately, with diversification of electronic devices, demands for a User Interface (UI) enabling intuitive inputs/outputs are increasing.

For example, electronic devices are evolving from a typical UI type of receiving information through an input/output unit, such as a keyboard, a keypad, and a mouse, to an intuitive UI type of receiving information according to a touch operation of touching a screen using a finger or an electronic pen or according to sound. A UI technique plays an important role in conveniently and easily using an electronic device.

SUMMARY

The present disclosure has been made to address at least the above-mentioned problems and/or disadvantages and to provide at least the advantages described below. Accordingly, an aspect of the present disclosure is to provide an electronic device of providing an intuitive, human-oriented User Interface (UI) while considering a user's convenience, and a method of controlling the electronic device using grip sensing.

Another aspect of the present disclosure is to provide an electronic device of controlling a predetermined function according to one of a gripped/ungripped state, a grip pattern, and a grip time period, and a method of controlling the electronic device using grip sensing.

Another aspect of the present disclosure is to provide an electronic device of controlling screen orientation according to a grip pattern when the electronic device rotates, and a method of controlling the electronic device using grip sensing.

Another aspect of the present disclosure is to provide an electronic device of controlling unlock according to a grip pattern and a grip time period when the electronic device is in a locked state, and a method of controlling the electronic device using grip sensing.

Another aspect of the present disclosure is to provide an electronic device of controlling volume or zoom-in/out by sensing a touch input on a grip sensing surface, and a method of controlling the electronic device using grip sensing.

Another aspect of the present disclosure is to provide an electronic device of ignoring a touch input on a touch screen or performing a function corresponding to the touch input according to whether or not the electronic device has been gripped, and a method of controlling the electronic device using grip sensing.

In accordance with an aspect of the present disclosure, an electronic device is provided. The device includes a touch sensor configured to sense at least one touch; a pressure sensor configured to sense at least one pressure; and a controller configured to sense a grip pattern on the electronic device using the touch sensor and the pressure sensor, and to control a predetermined function according to the grip pattern.

In accordance with another aspect of the present disclosure, a method of controlling an electronic device using grip sensing is provided. The method includes sensing a grip pattern on the electronic device; and controlling a predetermined function according to the grip pattern.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIGS. 12A-12B and 13A-13B illustrate screens that are displayed when volume is controlled in an electronic device and when zoom-in/out is controlled in an electronic device in the method illustrated in FIG. 11 according to the fifth embodiment of the present disclosure;

Throughout the drawings, like reference numerals will be understood to refer to like parts, components, and structures.

DETAILED DESCRIPTION OF EMBODIMENTS OF THE PRESENT INVENTION

Figure 1:
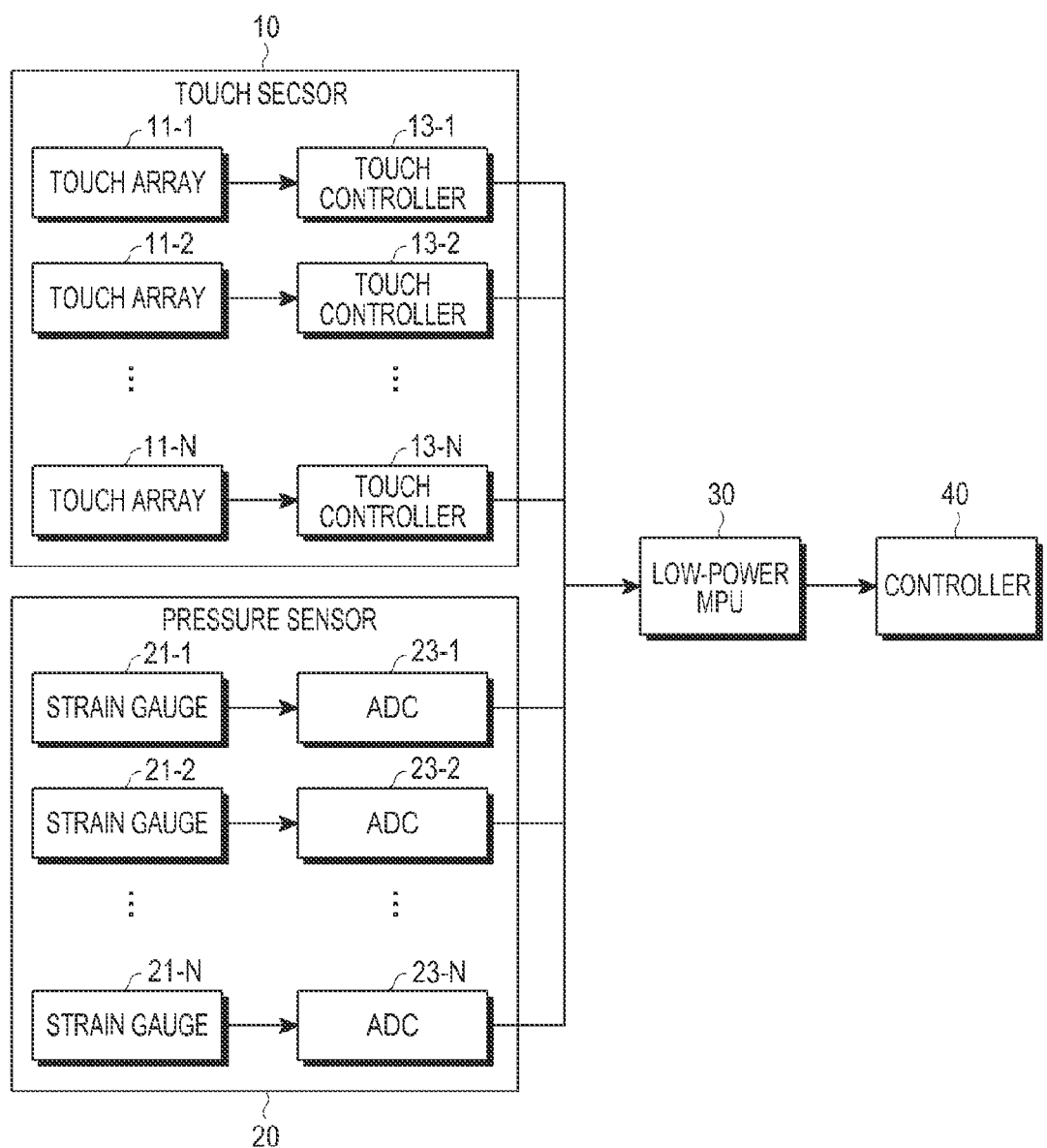
FIG. 1 is a conceptual configuration of an electronic device according to an embodiment of the present disclosure.

Hereinafter, embodiments of the present disclosure will be described in detail with reference to the appended drawings. However, the present disclosure is not limited to the embodiments. FIG. 1 illustrates a conceptual configuration of an electronic device according to an embodiment of the present disclosure. Referring to FIG. 1, the electronic device includes a touch sensor 10, a pressure sensor 20, a low-power Micro Processor Unit (MPU) 30, and a controller 40.

The touch sensor 10 may be provided in at least one side of the electronic device, for example, in the lateral sides of the electronic device in order to determine whether a user grips the electronic device. The touch sensor 10 includes one or more touch arrays 11-1 to 11-N and one or more touch controllers 13-1 to 13-N.

The touch arrays 11-1 to 11-N output touch sensing signals in response to a touch input by a pointing object, such as a finger or a pointing device. The touch controllers 13-1 to 13-N determine a touched area based on the touch sensing signals from the touch arrays 11-1 to 11-N, and outputs touch information corresponding to the touched area.

The pressure sensor 20 may be, like the touch sensor 10, provided in at least one side of the electronic device, for example, in the lateral sides of the electronic device. The pressure sensor 20 includes one or more strain gauges 21-1 to 21-N, and one or more Analog-to-Digital Converters (ADCs) 23-1 to 23-N. The strain gauges 21-1 to 21-N output analog pressure-sensed signals in response to pressing by an object, such as a finger or a pressure device. The ADCs 23-1 to 23-N convert the analog pressure-sensed signals into digital pressure information, and output the digital pressure information.

The low-power MPU 30 controls the electronic device with low power. The low-power MPU 30 receives touch information and pressure information from the touch sensor 10 and the pressure sensor 20, respectively, and processes the touch information and the pressure information with low power. The low-power MPU 30 may process touch information and pressure information from the touch sensor 10 and the pressure sensor 20 even when the electronic device is powered off. For example, the low-power MPU 30 determines any one of a gripped/ungripped state, a grip pattern, and a grip time period using at least one of touch information and pressure information from the touch sensor 10 and the pressure sensor 20 even when the electronic device is powered off. The gripped/ungripped state represents whether or not a user has gripped the electronic device. The grip pattern represents a pattern in which a user grips the electronic device. The grip time period represents a time period for which a user grips the electronic device.

The controller 40 determines a gripped/ungripped state, a grip pattern, and a grip time period based on touch information and pressure information, and controls a predetermined function of functions of the electronic device according to at least one of the gripped/ungripped state, the grip pattern, and the grip time period.

The electronic device may be any electronic device including the touch sensor 10, the pressure sensor 20, the low-power MPU 30, and the controller 40. Hereinafter, the electronic device is assumed to be a portable mobile terminal.

Figure 2:
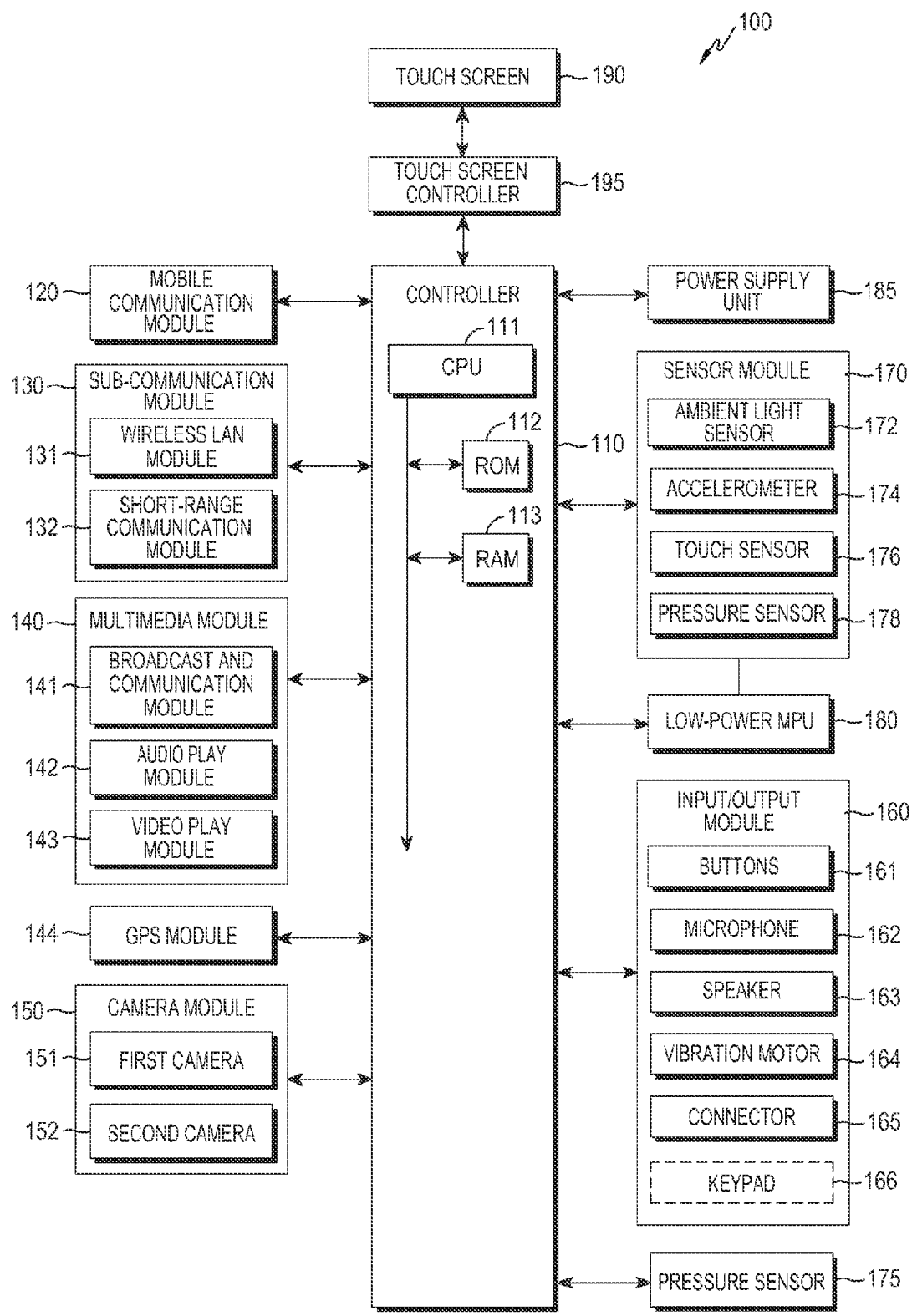
FIG. 2 is a block diagram illustrating a configuration of an electronic device according to an embodiment of the present disclosure.

FIG. 2 is a block diagram illustrating a configuration of an electronic device according to an embodiment of the present disclosure. Referring to FIG. 2, an electronic device (hereinafter, simply referred to as a "device") 100 connects to an external device using a mobile communication module 120, a sub communication module 130, and a connector 165. The external device may include another device, a mobile phone, a smart phone, a tablet Personal Computer (PC), and a server.

The device 100 includes a touch screen 190 and a touch screen controller 195. Also, the device 100 includes a controller 110, the mobile communication module 120, the sub communication module 130, a multimedia module 140, a Global Positioning System (GPS) module 144, a camera module 150, an input/output module 160, a sensor module 170, a storage unit 175, a power supply unit 185 and a low-power MPU 180.

The sub communication module 130 includes at least one of a Wireless Local Area Network (WLAN) module 131 and a short-range communication module 132. The multimedia module 140 includes at least one of a broadcasting and communication module 141, an audio play module 142, and a video play module 143. The camera module 150 includes at least one of a first camera 151 and a second camera 152. The input/output module 160 includes at least one of one or more buttons 161, a microphone 162, a speaker 163, a vibration motor 164, a connector 165, and a keypad 166.

The controller 110 includes a Central Processing Unit (CPU) 111, a Read Only Memory (ROM) 112 that stores control programs for controlling the device 100, and a Random Access Memory (RAM) 113 that temporarily stores signals/data received from the outside of the device 100 or is used as a workspace for operations performed in the device 100. The CPU 111 is a single-core processor, a dual-core processor, a triple-core processor, or a quad-core processor. The CPU 111, the ROM 112, and the RAM 113 is connected to each other through internal buses.

The controller 110 controls the mobile communication module 120, the sub communication module 130, the multimedia module 140, the GPS module 144, the camera module 150, the input/output module 160, the sensor module 170, the power supply unit 185, the low-power MPU 180, the storage unit 175, the touch screen 190, and the touch screen controller 195.

The controller 110 senses a user's grip when the user grips the electronic device 100 with his/her hand, and performs a predetermined control operation according to the user's grip.

The mobile communication module 120 enables the device 100 to connect to an external device through mobile communication using at least one antenna, under the control of the controller 110. The mobile communication module 120 may transmit/receive radio signals for voice calls, video calls, Short Message Service (SMS) messages, or Multimedia Message Service (MMS) messages, and video data to/from a mobile phone, a smart phone, a tablet PC, or another device, a phone number of each of which is entered or registered in the device 100.

The sub communication module 130 includes at least one of the WLAN module 131 and the short-range communication module 132.

The WLAN module 131 connects to the Internet at a place in which a wireless Access Point (AP) is installed, for example, using a WLAN antenna or a Wi-Fi antenna, under the control of the controller 110. The WLAN module 131 supports IEEE802.11x. The short-range communication module 132 performs wireless short-range communication between the device 100 and an imaging apparatus, under the control of the controller 110. The short-range communication is at least one of Bluetooth, Zigbee, and Infrared Data Association (IrDA). The device 100 includes at least one of the mobile communication module 120, the WLAN module 131, and the short-range communication module 132, according to performance. For example, the device 100 includes a combination of the mobile communication module 120, the WLAN module 131, and the short-range communication module 132, according to performance.

The multimedia module 140 includes, as described above, the broadcasting and communication module 141, the audio play module 142, or the video play module 143. The broadcasting communication module 141 receives, under the control of the controller 110, broadcasting signals (for example, TV broadcasting signals, radio broadcasting signals, or data broadcasting signals) and additional broadcasting information (for example, an Electric Program Guide (EPG) or an Electric Service Guide (ESG)) transmitted from a broadcasting station. The audio play module 142 plays, under the control of the controller 110, a digital audio file (with a file extension of, for example, ".mp3", ".wma", ".ogg", or ".wav") that is stored in the storage unit 175 or received from the outside. The video play module 143 plays, under the control of the controller 110, a digital video file (with a file extension of, for example, ".mpeg", ".mpg" ".mp4", ".avi", ".mov", or ".mkv") or a digital audio file that is stored in the storage unit 175 or received from the outside.

The multimedia module 140 may include the audio play module 142 and the video play module 143, excluding the broadcasting and communication module 141. The audio play module 142 or the video play module 143 of the multimedia module 140 may be incorporated into the controller 110.

The GPS module 155 receives radio waves from a plurality of GPS satellites in orbit around the Earth, and calculates the location of the device 100 based on a time of arrival of the radio waves from the GPS satellites to the device 100.

The camera module 150 includes at least one of the first camera 151 and the second camera 152 that photograph still images or moving images under the control of the controller 110. The first camera 151 or the second camera 152 includes an auxiliary light source (for example, a flash) that provides an amount of light required for photographing. The first camera 151 is disposed on the rear part of the device 100, and the first camera 152 is disposed on the front part of the device 100.

The input/output module 160 includes, as described above, at least one of the buttons 161, the microphone 162, the speaker 163, the vibration motor 164, the connector 165, and the keypad 166.

The buttons 161 is provided in the front, side, and/or rear part of the housing of the device 100. The buttons 161 includes at least one of a power/lock button, volume buttons, a menu button, a home button, a back button, and a search button.

The microphone 162 receives voice or sound to generate an electrical signal, under the control of the controller 110.

The speaker 163 receives, under the control of the controller 110, sound corresponding to various signals (e.g., radio signals, broadcasting signals, a digital audio file, a digital video file, or photo-shooting tones) from the mobile communication module 120, the sub communication module 130, the multimedia module 140, or the camera module 150, and outputs the sound to the outside of the device 100. Also, the speaker 163 outputs sound (e.g., button manipulation tones or ring back tones) corresponding to a function that is performed by the device 100.

The speaker 163 is provided as at least one unit at an appropriate location on the housing of the mobile terminal 100.

The vibration motor 164 converts an electrical signal into mechanical vibrations under the control of the controller 110. For example, when the device 100 is in a vibration mode, the vibration device 164 operates if a voice call is received from another device. The vibration device 164 may be provided as at least one unit in the housing of the device 100. The vibration device 164 may operate in response to a user's touch input of touching the touch screen 190 or a user's touch-and-drag input of touching and dragging the touch screen 190.

The connector 165 is used as an interface for connecting the device 100 to an external electronic device or a power source. The device 100 may transmit data stored in the storage unit 175 of the device 100 to an external electronic device through a wired cable connected to the connector 165, under the control of the controller 110, or the device 100 may receive data of an external electronic device through the wired cable connected to the connector 165. The device 100 may receive power or charge a battery from a power source through the wired cable connected to the connector 165.

The keypad 166 receives key input from a user in order to control the device 100. The keypad 166 is a physical keypad that is provided on the device 100, or a virtual keypad that is displayed on the touch screen 190. The device 100 may include no physical keypad according to a structure or performance of the device 100.

The sensor module 170 includes at least one sensor for detecting a status of the device 100. For example, the sensor module 170 includes an ambient light sensor 172 for measuring an amount of ambient light around the device 100, or an accelerometer 174 for detecting motion (e.g., rotation, acceleration, or vibration) of the device 100. The accelerometer 174 detects a state of the device 100, including the direction and inclination of the device 100, generates a signal corresponding to the detected state, and transmits the signal to the controller 110.

The sensor module 170 further include a touch sensor 176 that detects a contact made on the device 100 by a user's grip of holding or gripping the device 100, and a pressure sensor 178 that detects a pressure applied to the device 100.

The touch sensor 176 may be disposed in at least one side of the device 100, for example, in the lateral sides of the device 100 in order to detect a user's touch when the user holds or grips the device 100. The touch sensor 176 may include one or more touch arrays and one or more touch controllers. The touch arrays outputs touch sensing signals in response to a touch input by a pointing object, such as a finger or a pointing device. The touch controllers determine a touched area based on the touch sensing signals from the touch arrays, and output touch information corresponding to the touched area. The pressure sensor 178 may be, like the touch sensor 176, disposed in at least one side of the device 100, for example, in the lateral sides of the device 100. The pressure sensor 178 includes one or more strain gauges, and one or more ADCs. The strain gauges output analog pressure-sensed signals in response to pressing by an object, such as a finger or a pressure device. The ADCs converts the analog pressure-sensed signals into digital pressure information, and outputs the digital pressure information. The sensor module 170 may exclude a part of the above-mentioned sensors or further include another sensor, according to performance of the device 100.

The low-power MPU 180 controls a part of functions of the device 100 with low power. The low-power MPU 180 receives touch information and pressure information from the touch sensor 176 and the pressure sensor 178, and processes the touch information and the pressure information with low power. The low-power MPU 180 processes touch information and pressure information from the touch sensor 176 and the pressure sensor 178 even when the device 100 is powered off.

For example, the low-power MPU 180 determines one of a gripped/ungripped state, a grip pattern, and a grip time period based on at least one of touch information and pressure information from the touch sensor 176 and the pressure sensor 178 even when the device 100 is powered off. The gripped/ungripped state represents whether a user grips the device 100. The grip pattern represents a pattern in which a user grips the device 100. The grip time period represents a time period for which a user grips the device 100.

The power supply unit 185 supplies power to one or more battery packs installed in the housing of the device 100, under the control of the controller 110. The one or more battery packs supply power to the device 100. Also, the power supply unit 185 supply power received from an external power source through a wired cable connected to the connector 165, to the device 100.

The storage unit 175 stores signals or data that is input/output according to operations of the mobile communication module 120, the sub communication module 130, the multimedia module 140, the camera module 150, the GPS module 144, the input/output module 160, the sensor module 170, and the touch screen 190, under the control of the controller 110. The storage unit 175 also stores control programs and applications for controlling the device 100 or the controller 110.

The term a "storage unit" includes the storage unit 175, the ROM 112 or RAM 113 included in the controller 110, and a memory card (not shown, for example, a Secure Digital (SD) card or a memory stick) installed in the device 100. The storage unit 175 may be a non-volatile memory, a volatile memory, a Hard Disk Drive (HDD), or a Solid State Drive (SSD).

The touch screen 190 provides a user with User Interfaces (UIs) corresponding to various services (for example, a call, data transmission, broadcasting, and photographing) The touch screen 171 outputs an analog signal corresponding to at least one touch input inputted to a UI to the touch screen controller 195. The touch screen 190 receives at least one touch input through various objects, for example, a user's body part (for example, a user's finger including a thumb) or a pointing unit (for example, a stylus pen). Also, the touch screen 190 may receive a touch-and-drag input. In this case, the touch screen 190 transmits an analog signal corresponding to the touch-and-drag input to the touch screen controller 195.

The term "touch" is not limited to a contact of a user's body part or a pointing device to the touch screen 190, and may include non-contact recognition. A recognition distance in which the touch screen 190 can recognize the user's body part or the pointing device depends on the performance or structure of the device 100. The touch screen 190 may be a resistive touch screen, a capacitive touch screen, an infrared touch screen, an infrared touch screen, an acoustic wave touch screen, an Electro Magnetic Resonance (EMR) touch screen, or a combination thereof.

The controller 110 may also detect various user inputs received through the camera module 150, the input/output module 160, and the sensor module 170, as well as the touch screen 190. The user input includes various kinds of information input to the device 100, such as the user's gesture, the user's voice, the user's eye movements, the user's iris recognition, and a physiological signal from the user, as well as a touch operation.

The controller 110 controls the device 100 to perform a predetermined operation or function corresponding to a detected user input.

The touch sensor 176 and the pressure sensor 178 are disposed in a predetermined grip area such that a user's grip on the electronic device 100 can be easily detected. The predetermined grip area may be the side circumference of the electronic device 100.

Figure 3:
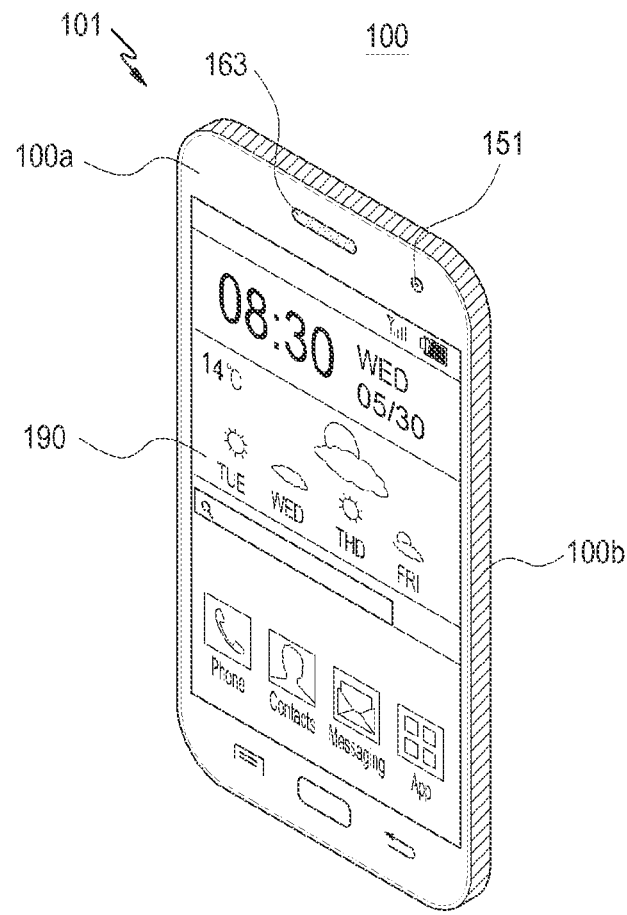
FIG. 3 illustrates a perspective view of a front part of an electronic device according to an embodiment of the present disclosure.

FIG. 3 illustrates a perspective view of a front part of the electronic device 100 according to an embodiment of the present disclosure. Referring to FIG. 3, the electronic device 100 has an appropriate size such that it can be gripped and handheld by a user, and may be a bar type terminal having a housing 101. The touch screen 190 is disposed in the front, center part 100a of the housing 101. The touch screen 190 occupies the major area of the front part 100a. The sides of the electronic device 100 form a grip area 100b, and the touch sensor 176 and the pressure sensor 178 are disposed in the grip area 100b so that a user's grip can be easily detected.

The electronic device 100 detects a grip when a user takes a grip operation of holding the electronic device 100, and performs a predetermined control operation according to the detected grip.

The electronic device 100 performs Rotation Lock to maintain displaying a first screen if a grip pattern does not change even when the electronic device 100 has rotated according to a user's gesture, and to perform, when the first screen has changed to a second screen, Rotation Back for returning to the first screen by detecting pressure from a user, if the user does not want the first screen to change the second screen. The Rotation Lock and the Rotation Back according to the first embodiment of the present disclosure will be described below in more detail.

Figure 4:
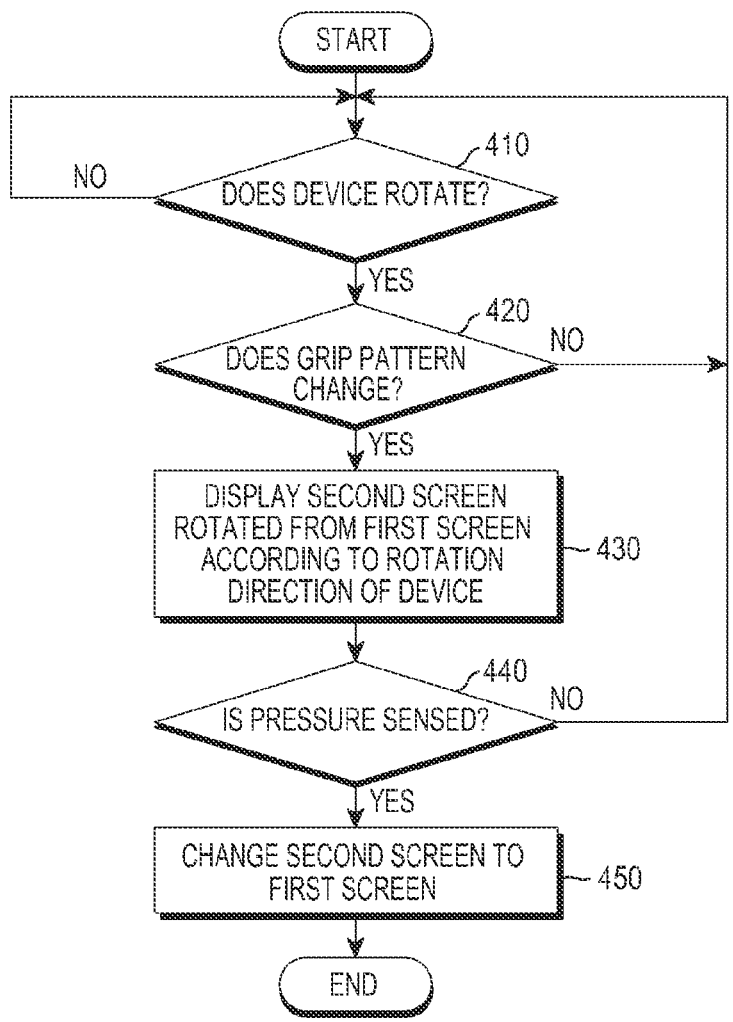
FIG. 4 is a flowchart illustrating a method of controlling screen orientation according to a grip pattern in an electronic device according to a first embodiment of the present disclosure.

FIG. 4 is a flowchart illustrating a method of controlling screen orientation according to a grip pattern in the electronic device 100 according to the first embodiment of the present disclosure, and FIGS. 5A-5C and 6A-6B illustrate screens that are displayed according to grip patterns in the method illustrated in FIG. 4 according to the first embodiment of the present disclosure.

Referring to FIG. 4, the electronic device 100 determines whether the electronic device 100 rotates, in step 410. The electronic device 100 determines whether the electronic device 100 rotates, and determines a rotation direction, using the accelerometer 174 (see FIG. 2).

If the electronic device 100 determines that the electronic device 100 rotates, the electronic device 100 determines whether a grip pattern changes, in step 420. The grip pattern is a contact pattern on the grip area 100*b*, made when an object such as a hand contacts the grip area 100*b*. For example, the electronic device 100 determines, if the electronic device 100 rotates clockwise from a vertical position displayed as shown in FIG. 5A to a horizontal position displayed as shown in FIGS. 5B and 5C, whether a grip pattern has changed.

Figure 5:
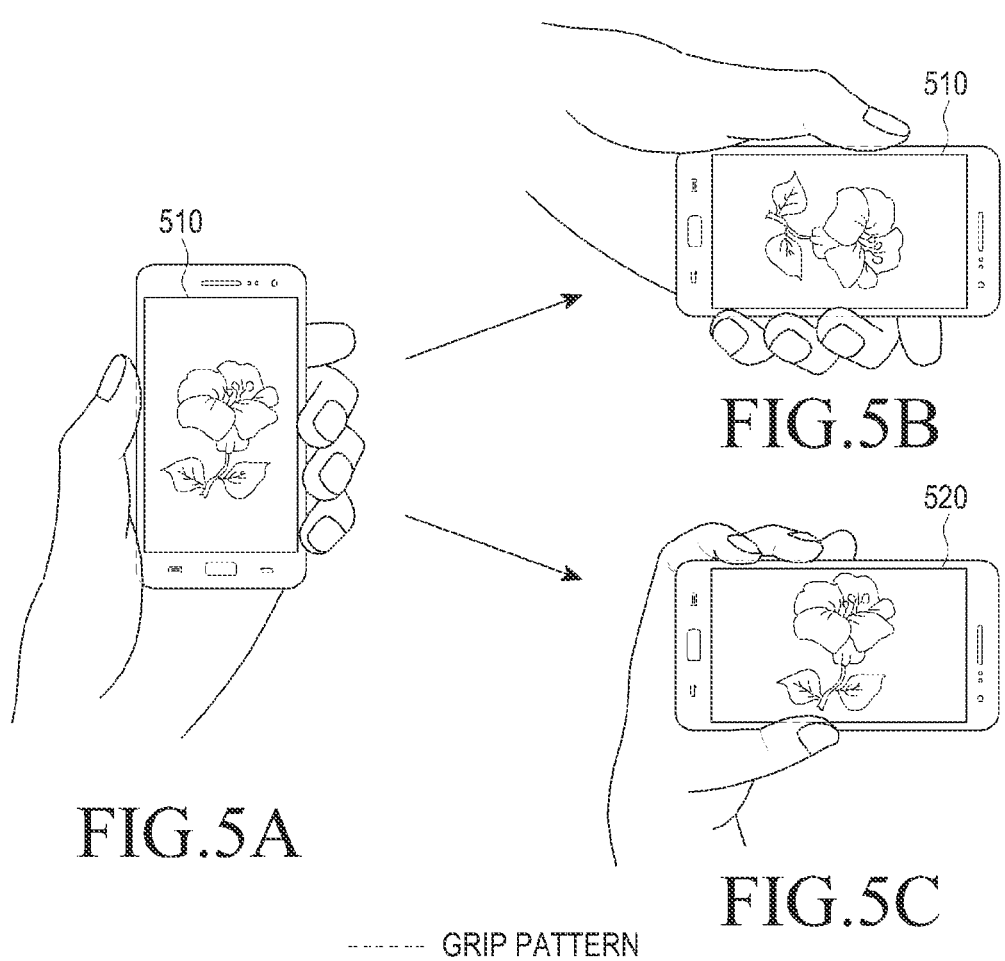
FIGS. 5A-5C and 6A-6B illustrate screens that are displayed according to grip patterns in the method illustrated in FIG. 4 according to the first embodiment of the present disclosure.

If the electronic device 100 determines that a grip pattern has changed, the electronic device 100 displays a second screen 520 as shown in FIG. 5C, according to the rotation direction of the electronic device 100, in step 430. If the electronic device 100 determines that a grip pattern has not changed, the electronic device 100 returns to step 410 to keep displaying a first screen 510 as shown in FIG. 5B, which is previously shown in FIG. 5A.

According to the first embodiment of the present disclosure, by rotating a screen if a grip pattern changes when the electronic device 100 rotates, instead of rotating a screen unconditionally when the electronic device 100 rotates, unintended screen orientation may be prevented.

After displaying the second screen 520, the electronic device 100 determines whether pressure is sensed, in step 440. The electronic device 100 senses pressure applied on the grip area 110*b* (see FIG. 3) through the pressure sensor 178 (see FIG. 2).

Figure 6:
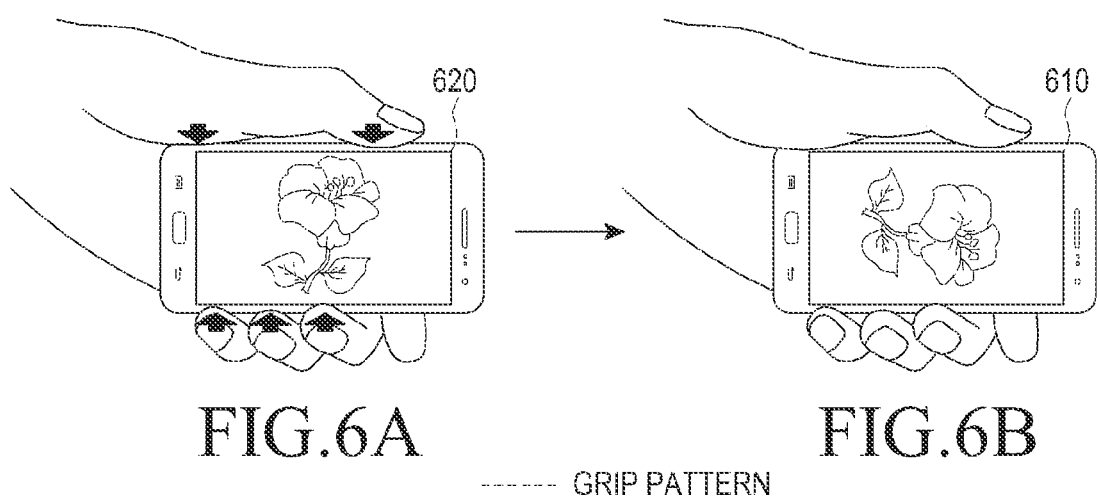

If the electronic device 100 determines that pressure is sensed, the electronic device 100 changes the second screen back to the first screen, in step 450. For example, if pressure is sensed when a second screen 620 as shown in FIG. 6A is displayed, the electronic device 100 changes the second screen 620 to a first screen 610 as shown in FIG. 6B, which is a screen before screen orientation. If the electronic device 100 determines that no pressure is sensed, the electronic device 100 keeps displaying the second screen 520.

According to the first embodiment of the present disclosure, if the user wants to see the first screen 510 again when the first screen 510 has changed to the second screen 520 by rotating the electronic device 100, the user may perform a simple manipulation of applying pressure to the electronic device 100 to thereby see the first screen 510.

According to a second embodiment of the present disclosure, the electronic device 100 may control grip-to-run operation of executing a predetermined function according to a predetermined grip pattern when a user grips the electronic device 100. The grip-to-run operation according to the second embodiment of the present disclosure will be described below in detail.

Figure 7:
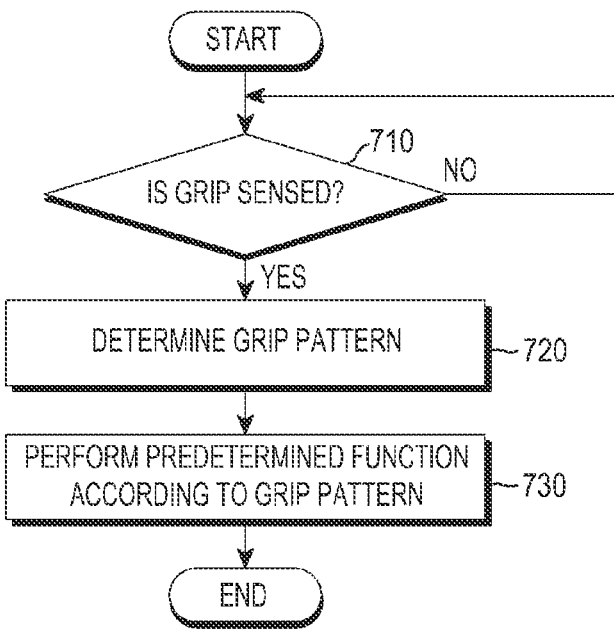
FIG. 7 is a flowchart illustrating a method of controlling execution of a function according to a grip pattern in an electronic device according to a second embodiment of the present disclosure.
Figures 8A, 8B:
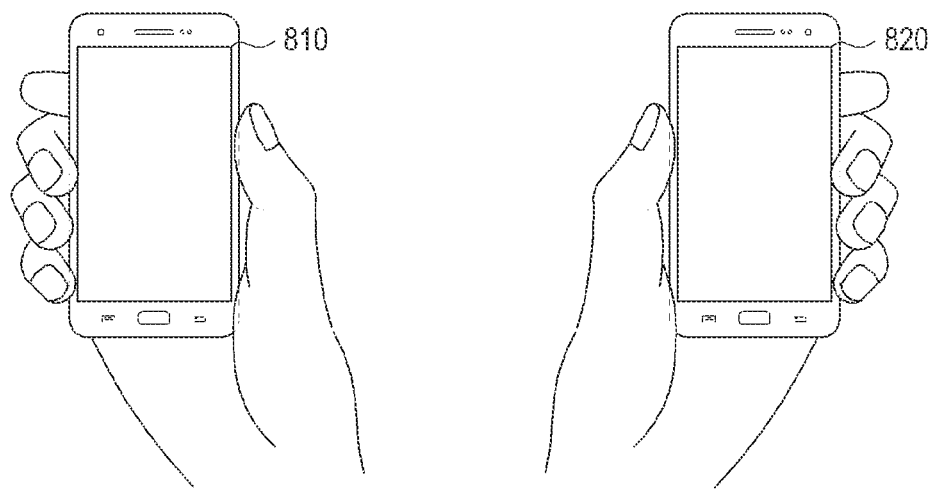
FIGS. 8A-8B illustrate examples of grip patterns in the method illustrated in FIG. 7 according to the second embodiment of the present disclosure.

FIG. 7 is a flowchart illustrating a method of controlling execution of a function according to a grip pattern in the electronic device 100 according to the second embodiment of the present disclosure, and FIGS. 8A-8B illustrate examples of grip patterns in the method illustrated in FIG. 7 according to the second embodiment of the present disclosure.

Referring to FIG. 7, the electronic device 100 determines whether a grip is sensed, in step 710. The electronic device 100 determines whether a user has gripped the electronic device 100, that is, whether a grip is sensed, based on touch information acquired through the touch sensor 176 (see FIG. 2) included in the grip area 100*b* (see FIG. 3) of the electronic device 100.

If the electronic device 100 determines that a grip is sensed, the electronic device 100 determines a grip pattern, in step 720.

FIG. 8A shows a grip pattern made when a user has held (gripped) the electronic device 100 with his/her right hand. When the user has gripped the electronic device 100 with his/her right hand, the user's thumb contacts the right lateral side of the electronic device 100, and the user's middle, ring, and little fingers contact the left lateral side of the electronic device 100 so that a grip pattern can be determined according to the user's contact fingers.

FIG. 8B shows a grip pattern made when a user has gripped the electronic device 100 with his/her left hand. When the user has gripped the electronic device 100 with his/her left hand, the user's thumb contacts the left lateral side of the electronic device 100, and the user's middle, ring, and little fingers contact the right lateral side of the electronic device 100 so that a grip pattern can be determined according to the user's contact fingers. For example, the electronic device 100 determines a grip pattern based on areas on which an object such as a hand contacts the grip area 100*b* (see FIG. 3), and the grip pattern depends on how a user grips the electronic device 100.

If a grip pattern is determined, the electronic device 100 may perform a predetermined function according to the grip pattern, instep 730. Each grip pattern is set in advance to execute a predetermined program or a predetermined function. The predetermined program or the predetermined function may include a camera function, a web browser function, a game function, a text message transmission function, and a music play program, but is not limited thereto, and may include another function that can be executed in the electronic device 100.

According to the second embodiment of the present disclosure, since a desired function can be directly executed according to operation of gripping the electronic device 100, a user can easily and simply execute his/her desired function.

According to a third embodiment of the present disclosure, the electronic device 100 may control grip command generation operation of generating, if a specific grip pattern is sensed whenever a function is executed, a function execution command according to the specific grip pattern. The grip command generation operation according to the third embodiment of the present disclosure will be described below in detail.

Figure 9:
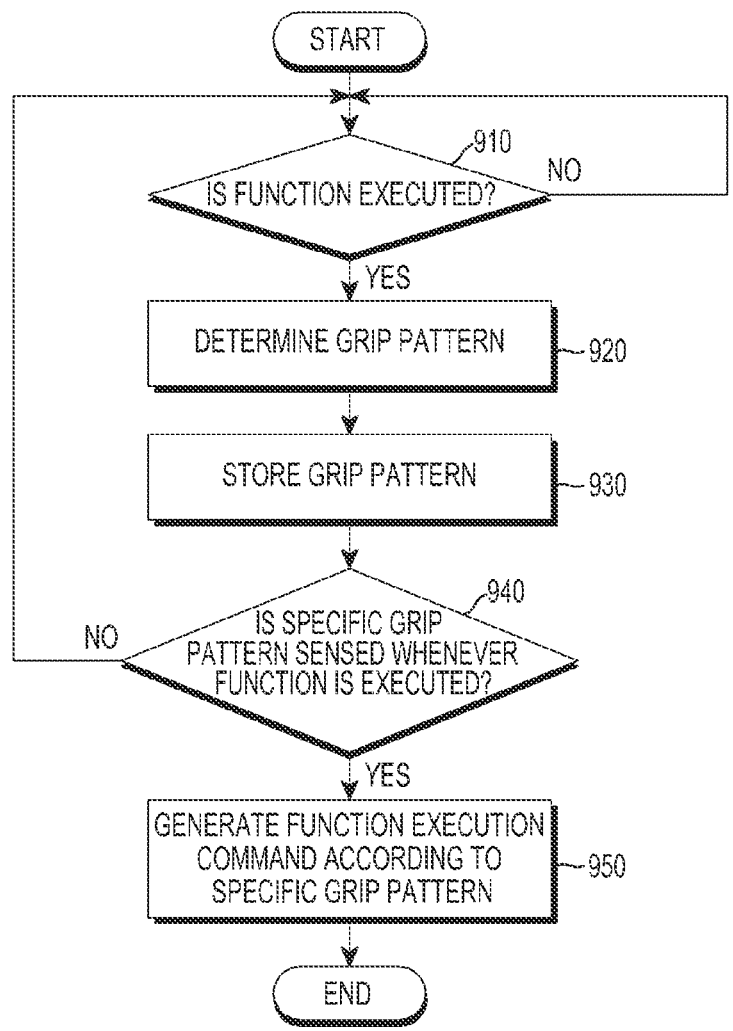
FIG. 9 is a flowchart illustrating a method of controlling generation of a command according to a grip pattern in an electronic device according to a third embodiment of the present disclosure.

FIG. 9 is a flowchart illustrating a method of controlling generation of a command using a grip pattern in the electronic device 100 according to the third embodiment of the present disclosure.

Referring to FIG. 9, the electronic device 100 determines whether a function is executed, in step 910. The function may be a predetermined program or a predetermined function, may include a camera function, a web browser function, a game function, a text message transmission function, and a music play program, but is not limited thereto, and may be another function that can be executed in the electronic device 100.

If the electronic device 100 determines that a function is executed, the electronic device 100 determines a grip pattern, in step 920. For example, the electronic device 100 determines a grip pattern based on contact areas on the grip area 100*b* if a user grips the electronic device 100 when the function is executed. The electronic device 100 stores the grip pattern, in step 930.

The electronic device 100 determines whether a specific grip pattern is sensed whenever the function is executed, in step 940. For example, the electronic device 100 determines whether a specific grip pattern is sensed whenever a camera function is executed.

If the electronic device 100 determines that a specific grip pattern is sensed whenever the function is executed, the electronic device 100 generates a function execution command according to the specific grip pattern, in step 950. For example, if the electronic device 100 determines that a specific grip pattern is sensed whenever a camera function is executed, the electronic device 100 generates a grip command for executing the camera function.

According to the third embodiment of the present disclosure, by generating a grip command for executing a function using a specific grip pattern in which a user has gripped the electronic device 100 when executing the function, the user can conveniently execute the function.

According to a fourth embodiment of the present disclosure, the electronic device 100 may control a grip pattern unlock operation for unlocking the electronic device 100 according to a grip pattern, and control a grip-to-on operation for powering on the electronic device 100 according to a time period for which a user grips the electronic device 100 when the electronic device 100 is in a power-off state. The grip pattern unlock operation and the grip-to-on operation according to the fourth embodiment of the present disclosure will be described below in detail.

Figure 10:
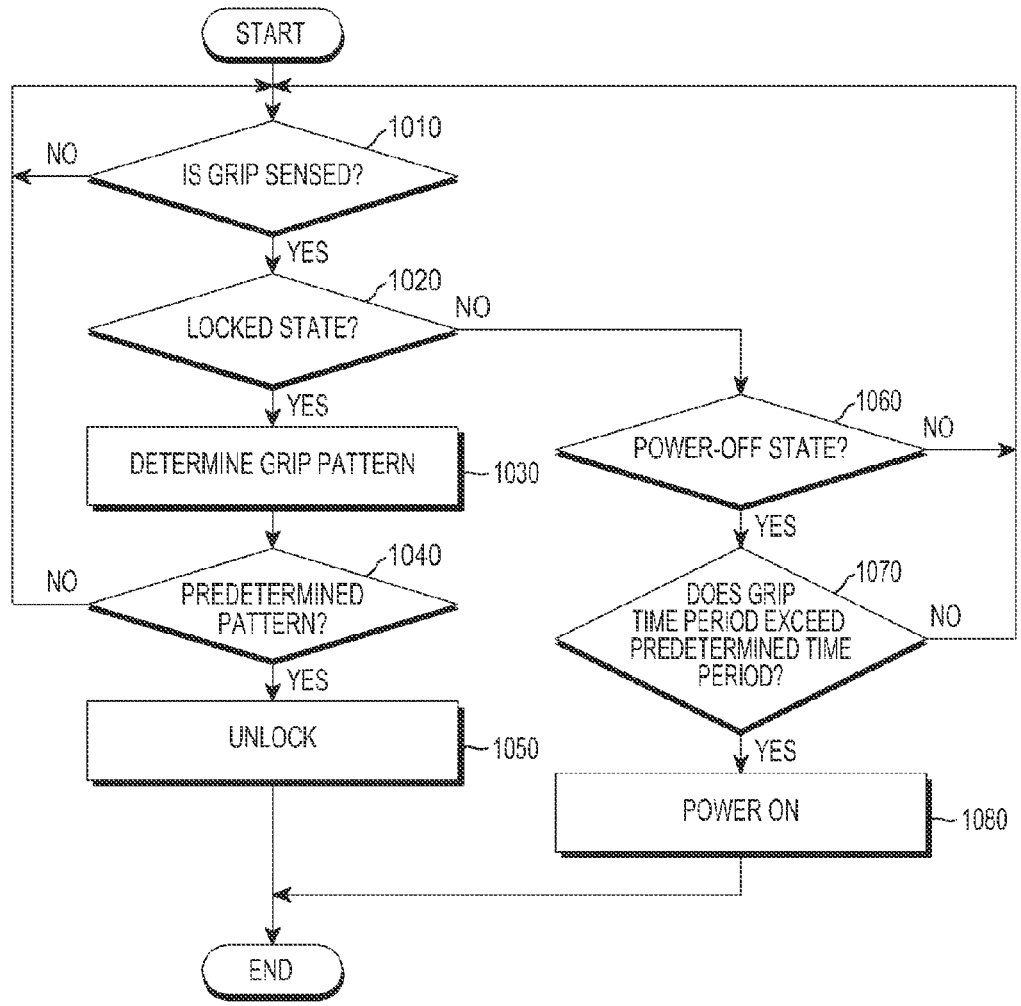
FIG. 10 is a flowchart illustrating a method of controlling unlock and power-on using grip sensing in an electronic device according to a fourth embodiment of the present disclosure.

FIG. 10 is a flowchart illustrating a method of controlling unlock and power-on using grip sensing in the electronic device 100 according to the fourth embodiment of the present disclosure.

Referring to FIG. 10, the electronic device 100 determines whether a grip is sensed, in step 1010. The electronic device 100 determines whether a user has gripped the electronic device 100, that is, whether a grip is sensed, based on touch information acquired through the touch sensor 176 (see FIG. 2) included in the grip area 100b (see FIG. 3) of the electronic device 100.

If the electronic device 100 determines that a grip is sensed, the electronic device 100 determines whether the electronic device 100 is in a locked state, in step 1020.

If the electronic device 100 determines that the electronic device 100 is in a locked state, the electronic device 100 determines a grip pattern, in step 1030. For example, the electronic device 100 determines a grip pattern based on areas on which an object such as a hand contacts the grip area 100b, and the grip pattern depends on how a user grips the electronic device 100. If a grip pattern is determined, the electronic device 100 determines whether the grip pattern is a predetermined grip pattern, in step 1040. The predetermined grip pattern is a grip pattern set to unlock the electronic device 100. If the electronic device 100 determines that the grip pattern is a predetermined grip pattern, the electronic device 100 unlocks the electronic device 100, in step 1050.

If the electronic device 100 determines in step 1020 that the electronic device is not in a locked state, the electronic device 100 determines whether the electronic device 100 is in a power-off state, in step 1060. If the electronic device 100 determines that the electronic device 100 is in a power-off state, the electronic device 100 determines whether a grip time period exceeds a predetermined time period, in step 1070.

If the electronic device 100 determines that a grip time period exceeds a predetermined time period, the electronic device 100 performs power-on, in step 1080. At this time, if the electronic device 100 determines that a grip time period exceeds a predetermined time period, the electronic device 100 displays a message or a screen asking whether to power on the electronic device 100, on the touch screen 190 (see FIG. 3), and performs power-on after receiving confirmation from the user.

According to the fourth embodiment of the present disclosure, since a user can unlock or power on the electronic device 100 by gripping the electronic device 100, without having to perform a separate manipulation for unlocking or for power-on, user convenience may increase.

According to a fifth embodiment of the present disclosure, the electronic device 100 may perform strength control operation of adjusting the volume of the speaker 163 (see FIG. 2) or zooming in/out the camera module 150 (see FIG. 2) if a predetermined input is sensed on the grip area 100b (see FIG. 3) when the electronic device 100 has been gripped. The strength control operation according to the fifth embodiment of the present disclosure will be described below in detail.

Figure 11:
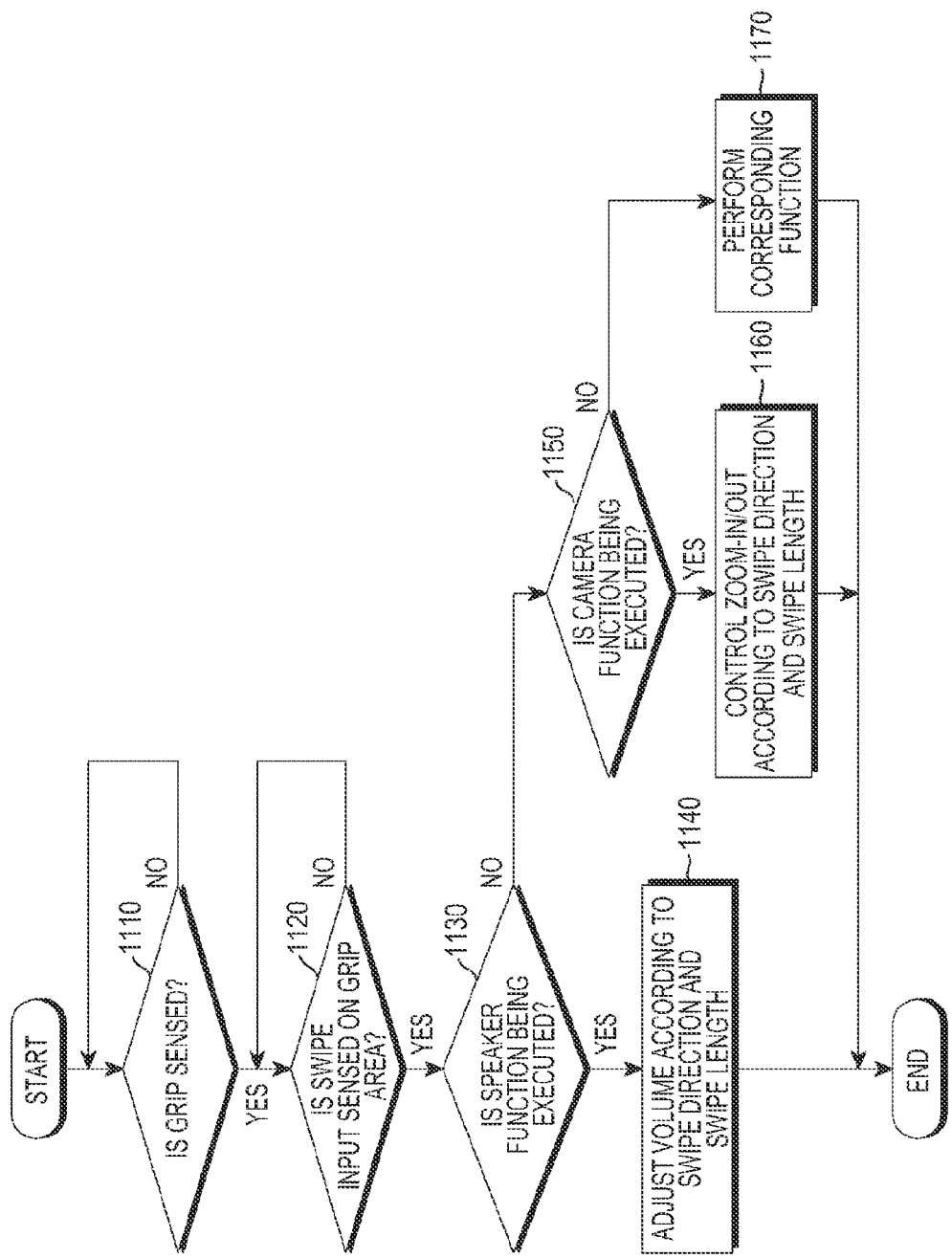
FIG. 11 is a flowchart illustrating a method of controlling volume or zoom-in/out when a predetermined input is sensed on a grip area in an electronic device according to a fifth embodiment of the present disclosure.

FIG. 11 is a flowchart illustrating a method of controlling volume or zoom-in/out when a predetermined input is sensed on the grip area 100b (see FIG. 3) in the electronic device 100, according to the fifth embodiment of the present disclosure, and FIGS. 12A-12B and 13A-13B illustrate screens that are displayed when volume is adjusted in the electronic device 100 and when zoom-in/out is controlled in the electronic device 100, respectively, in the method illustrated in FIG. 11 according to the fifth embodiment of the present disclosure.

Referring to FIG. 11, the electronic device 100 determines whether a grip is sensed, in step 1110. The electronic device 100 determines whether a user has gripped the electronic device 100, that is, whether a grip is sensed, based on touch information acquired through the touch sensor 176 (see FIG. 2) included in the grip area 100b (see FIG. 3) of the electronic device 100.

If the electronic device 100 determines that a grip is sensed, the electronic device 100 determines whether an input (for example, a swipe input) of sliding a lateral side of the electronic device 100 is sensed on a part of the grip area 100b, in step 1120. The swipe input is an input of touching and dragging straightly an area with a finger. The swipe input can be also referred to as a scroll input.

If the electronic device 100 determines that a swipe input is sensed, the electronic device 100 determines whether a speaker function is being executed, in step 1130. If the electronic device 100 determines that a speaker function is being executed, the electronic device 100 adjusts the volume according to the direction and length of the swipe input, in step 1140.

For example, if a swipe input is sensed on a part of the left lateral side of the electronic device 100 when the electronic device 100 is in a vertical position (i.e., a up-side up position), as shown in FIG. 12A, the electronic device 100 performs, if the direction of the swipe input is an up direction, volume-up according to the length of the swipe input, and performs, if the direction of the swipe input is a down direction, volume-down according to the length of the swipe input. Also, if a swipe input is sensed on a part of the up lateral side of the electronic device 100 after the electronic device 100 rotates counterclockwise by 90 degrees, as shown in FIG. 12B, the electronic device 100 performs, if the direction of the swipe input is an up direction, volume-up according to the length of the swipe input, and performs, if the direction of the swipe input is a down direction, volume-down according to the length of the swipe input.

If the electronic device 100 determines that a speaker function is not being executed, the electronic device 100 determines whether a camera function is being executed, in step 1150. If the electronic device 100 determines that a camera function is being executed, the electronic device 100 controls the zoom-in/out according to the direction and length of the swipe input, in step 1160.

For example, if a swipe input is sensed on a part of the right lateral side of the electronic device 100 when the electronic device 100 is in a horizontal position (i.e., a up-side left position), as shown in FIG. 13A, the electronic device 100 performs, if the direction of the swipe input is a left direction, zoom-in according to the length of the swipe input, and performs, if the direction of the swipe input is a right direction, zoom-out according to the length of the swipe input. Also, if a swipe input is sensed on a part of the right lateral side of the electronic device 100 after the electronic device 100 rotates clockwise by 90 degrees, as shown in FIG. 13B, the electronic device 100 performs, if the direction of the swipe input is a up direction, zoom-in according to the length of the swipe input, and may perform, if the direction of the swipe input is a down direction, zoom-out according to the length of the swipe input.

If the electronic device 100 determines that neither a speaker function nor a camera function is being executed, the electronic device 100 performs adjustment according to another function being executed, in step 1170. For example, if a picture view function is being executed, the electronic device 100 performs picture enlargement or picture reduction, and if a web browser function is being executed, the electronic device 100 scrolls a web page up or down.

According to the fifth embodiment of the present disclosure, a user can control volume or zoom-in/out by sliding the grip area 100b (see FIG. 3) while gripping the electronic device 100, resulting in an increase of convenience.

According to a sixth embodiment of the present disclosure, the electronic device 100 may determine whether the electronic device 100 has been gripped, when a touch input is sensed on the touch screen 190 (see FIG. 3), and perform palm rejection of ignoring touch inputs on grip areas, if the electronic device 100 has been gripped. For example, if a touch input is sensed on the touch screen 190, the electronic device 100 may perform palm rejection of ignoring a user's unintended touch inputs on grip areas. The palm rejection according to the sixth embodiment will be described below in detail.

Figure 14:
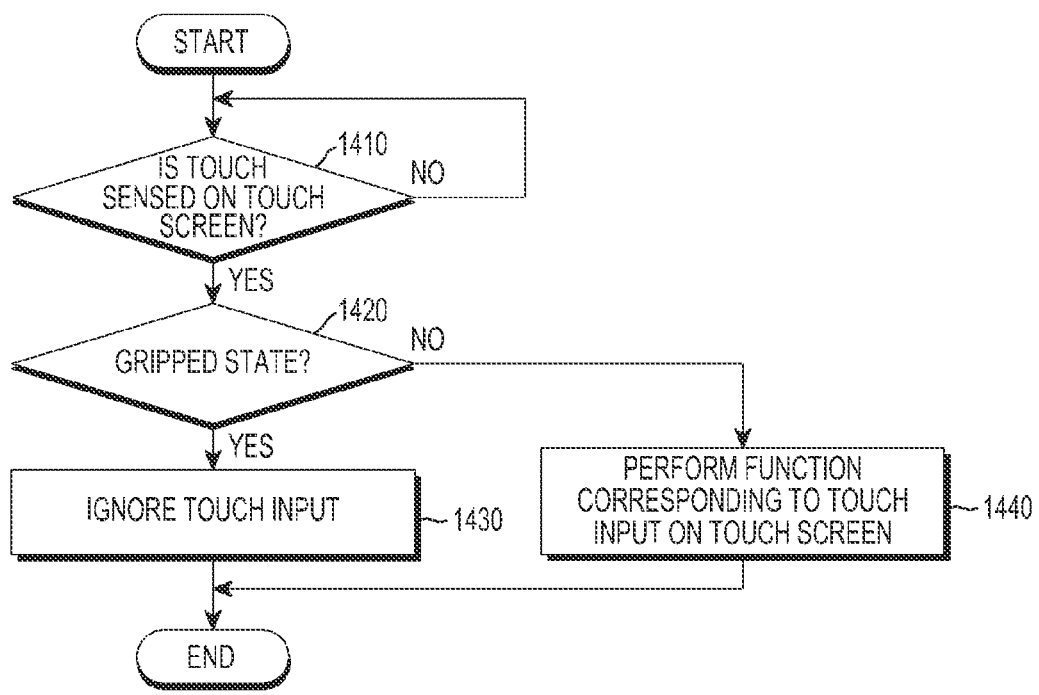
FIG. 14 is a flowchart illustrating a method of ignoring a touch input on a touch screen when an electronic device has been gripped according to a sixth embodiment of the present disclosure.
Figure 15:
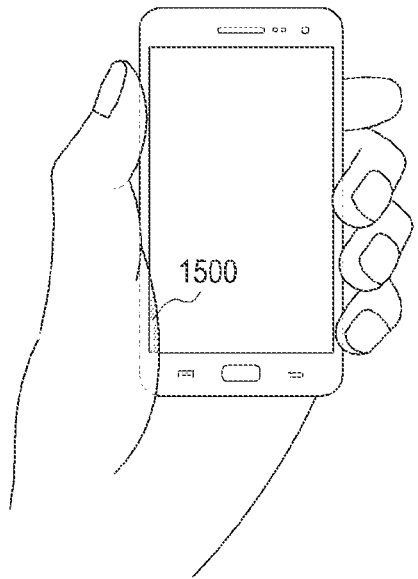
FIG. 15 illustrates a screen for describing the method illustrated in FIG. 14 according to the sixth embodiment of the present disclosure.

FIG. 14 is a flowchart illustrating a method of ignoring a touch input on a touch screen according to whether the electronic device 100 has been gripped, according to the sixth embodiment of the present disclosure, and FIG. 15 illustrates a screen for describing the method illustrated in FIG. 14, according to the sixth embodiment of the present disclosure.

Referring to FIG. 14, the electronic device 100 determines whether a touch input is sensed on the touch screen 190 (see FIG. 3), in step 1410. If a touch input is sensed on the touch screen 190, the electronic device 100 determines whether the electronic device 100 has been gripped, in step 1420. The electronic device 100 determines whether a user has gripped the electronic device 100, that is, whether a grip is sensed, through touch information acquired through the touch sensor 176 (see FIG. 2) included in the grip area 100b (see FIG. 3).

If the electronic device 100 determines that the electronic device 100 has been gripped, the electronic device 100 ignores the touch input on the touch screen 190 (see FIG. 3), in step 1430. If the electronic device 100 determines that the electronic device 100 has not been gripped, the electronic device 100 performs a function corresponding to the touch input on the touch screen 190, in step 1440.

For example, if a touch input 1500 by a palm is sensed on the touch screen 190 when a user grips the electronic device 100 with his/her hand, as shown in FIG. 15, the electronic device 100 ignores the touch input 1500 on the touch screen 190 as an unintended touch input on the touch screen 190, thereby enabling accurate recognition of a touch input on the touch screen 190.

If a touch input is actually performed on an area on which a touch by a grip is expected, the palm rejection may be implemented as another embodiment of the present disclosure.

Figure 16:
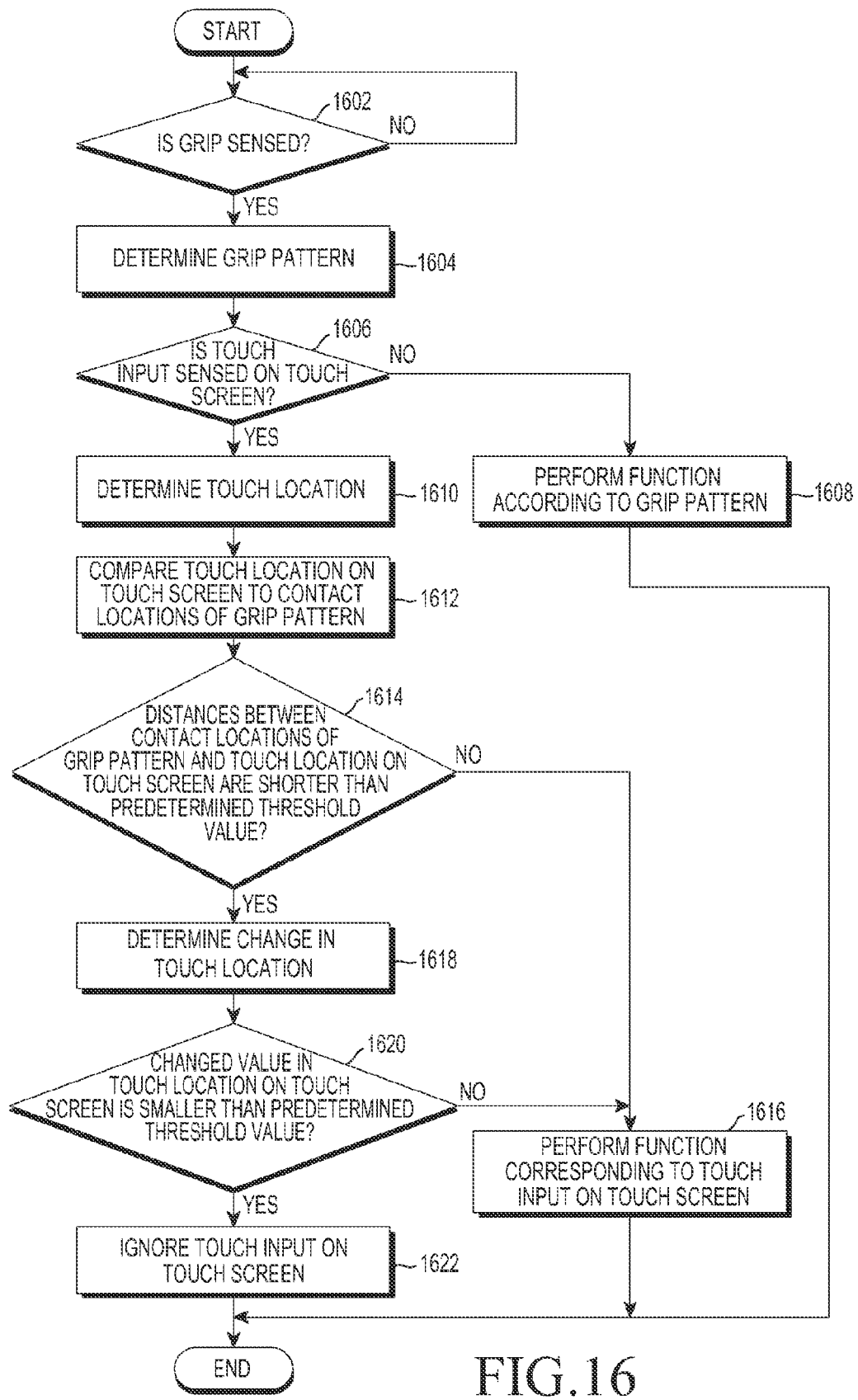
FIG. 16 is a flowchart illustrating a method of ignoring a touch input on a touch screen when an electronic device has been gripped according to a seventh embodiment of the present disclosure.
Figure 17A:
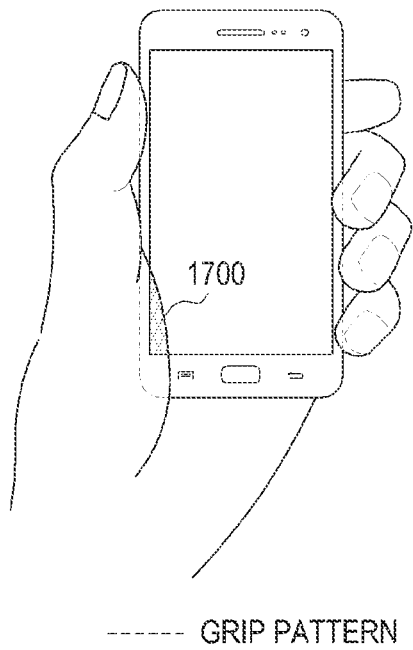
FIGS. 17A-17B illustrate screens for describing the method illustrated in FIG. 16 according to the seventh embodiment of the present disclosure.
Figure 17B:
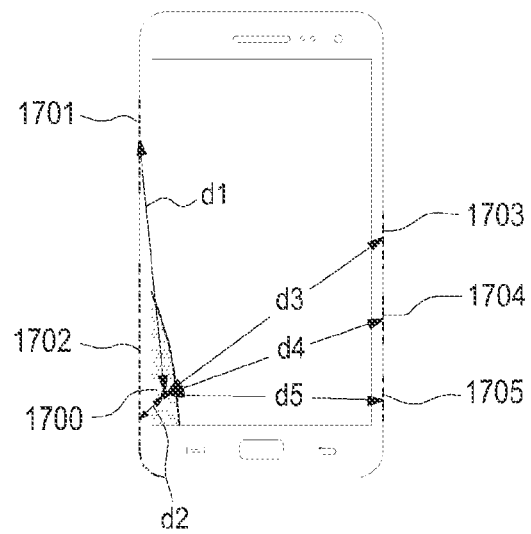

FIG. 16 is a flowchart illustrating a method of ignoring a touch input on the touch screen 190 when the electronic device 100 has been gripped, according to a seventh embodiment of the present disclosure, and FIGS. 17A-17B illustrate screens for describing the method illustrated in FIG. 16 according to the seventh embodiment of the present disclosure.

Referring to FIG. 16, the electronic device 100 determines whether a grip is sensed, in step 1602. For example, the electronic device 100 determines whether a user has gripped the electronic device 100, that is, whether a grip is sensed, based on touch information acquired through the touch sensor 176 (see FIG. 2) included in the grip area 100b (see FIG. 3).

If the electronic device 100 determines that the electronic device 100 has been gripped, the electronic device 100 determines a grip pattern, in step 1604. For example, when the user has gripped the electronic device 100 with his/her right hand, the user's thumb contacts the right lateral side of the electronic device 100, and the user's middle, ring, and little fingers contact the left lateral side of the electronic device 100 so that a grip pattern can be determined according to the user's contact fingers.

As another example, when the user has gripped the electronic device 100 with his/her left hand, the user's thumb contacts the left lateral side of the electronic device 100, and the user's middle, ring, and little fingers contact the right lateral side of the electronic device 100 so that a grip pattern can be determined according to the user's contact fingers. The electronic device 100 determines a grip pattern based on areas on which an object such as a hand contacts the grip area 100b, and the grip pattern depends on how a user grips the electronic device 100.

If a grip pattern is determined, the electronic device 100 determines whether a touch input is sensed on the touch screen 190, in step 1606.

For example, when a user has gripped the electronic device 100 with his/her hand so that his/her palm contacts the touch screen 190 (see FIG. 3), as shown in FIG. 17A, the electronic device 100 determines a touch input by the palm.

If the touch screen 190 is not touched, the electronic device 100 performs a predetermined function or a predetermined program according to a grip pattern, in step 1608. For example, each grip pattern is set in advance to execute a predetermined program or a predetermined function. The predetermined program or the predetermined function may include a camera function, a web browser function, a game function, a text message transmission function, and a music play program, but is not limited thereto, and may include another function that can be executed in the electronic device 100.

If a grip pattern is determined, and a touch input is sensed on the touch screen 190 (see FIG. 3), the electronic device 100 determines a touch location of the touch input on the touch screen 190, in step 1610.

The electronic device 100 compares contact locations of the grip pattern to the touch location on the touch screen 190, in step 1612.

The electronic device 100 determines whether distances between the contact locations of the grip pattern and the touch location on the touch screen 190 are shorter than a predetermined threshold value, in step 1614. For example, the electronic device 100 determines whether distances d1, d2, d3, d4, and d5 between contact locations 1701, 1702, 1703, 1703, and 1703 of the grip pattern and a touch location 1700 on the touch screen 190 are shorter than a predetermined threshold value, as shown in FIG. 17B.

If the electronic device 100 determines that the distances between the contact locations of the grip pattern and the touch location on the touch screen 190 are not shorter than the predetermined threshold value, the electronic device 100 performs a function corresponding to the touch input on the touch screen 190, in step 1616.

If the electronic device 100 determines that the distances between the contact locations of the grip pattern and the touch location on the touch screen 190 are shorter than the predetermined threshold value, the electronic device 100 determines a change in touch location on the touch screen 190, in step 1618. Since a palm touch by a user has a small change in touch location, whether a touch on the touch screen 190 is a palm touch may be determined based on a changed value in touch location.

The electronic device 100 determines whether a changed value in touch location on the touch screen is less than a predetermined threshold value, in step 1620. The predetermined threshold value may be decided in advance through a test regarding when a touch on the touch screen 190 is a palm touch and when a touch on the touch screen 190 is not a palm touch.

If the changed value in touch location is not less than the predetermined threshold value, the electronic device 100 determines that the touch input on the touch screen 190 is not a touch input by a palm, and proceeds to step 1616 to execute a function corresponding to the touch input on the touch screen.

If the changed value in touch location is less than the predetermined threshold value, the electronic device 100 determines that the touch input on the touch screen 190 is a touch input by a palm, and ignores the touch input 1700 on the touch screen 190, in step 1622.

The methods according to the embodiments as described above may be implemented in the form of program instructions that can be executed using various types of computer means, and may be stored on a computer-readable medium. The computer-readable medium may include program instructions, data files, data structures, etc. independently or in combination. The program instructions stored on the medium may be designed especially for the present disclosure or may also be known to and be used by those skilled in the art of computer software.

The methods according to the embodiments of the present disclosure can be realized in the form of hardware, software, or a combination of hardware and software. Any such software may be stored in volatile or non-volatile storage such as, for example, a storage device like a ROM, whether erasable or rewritable or not, in memory such as, for example, RAM, a memory chip, a device or an integrated circuit, or in an optically or magnetically writable, machine (e.g., a computer)-readable medium such as, for example, a Compact Disk (CD), a Digital Versatile Disk (DVD), a magnetic disk or a magnetic tape, or the like.

The methods according to the embodiments of the present disclosure may be implemented by a computer or a mobile terminal including a controller and a memory. The memory is an example of a machine-readable storage medium suitable to store a program or programs including instructions for implementing embodiments of the present disclosure. Accordingly, the methods according to the embodiments of the present disclosure include a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Also, the electronic device according to the embodiments of the present disclosure may receive and store the program from a program providing apparatus connected in a wired/wireless fashion thereto. The program providing apparatus may include a memory for storing a program including instructions to perform the methods according to the embodiments of the present disclosure, a communication unit for wired/wireless communication with a portable electronic device, and a controller for controlling the communication unit to transmit the corresponding program according to a request from the portable electronic device or automatically.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
a touch screen disposed on a front of the electronic device;
a touch sensor configured to sense at least one touch on at least two different lateral sides of the electronic device;
a pressure sensor configured to sense at least one pressure on the at least two different lateral sides of the electronic device; and
a controller configured to determine a grip pattern, and a time period for which the grip pattern is maintained, on the electronic device using the touch sensor and the pressure sensor, and to control a predetermined function according to the grip pattern and the time period,
wherein the controller determines the grip pattern on the electronic device based on the sensed at least one touch and the sensed at least one pressure on the at least two different lateral sides of the electronic device, and
wherein the controller changes a first screen to a second screen rotated from the first screen, based on a change of the grip pattern.

2. The electronic device of claim 1, wherein the touch sensor and the pressure sensor are disposed in a grip area on the lateral sides of the electronic device.

3. The electronic device of claim 1, wherein when the electronic device rotates, the controller is configured to maintain displaying of the first screen if the grip pattern of the electronic device does not change.

4. The electronic device of claim 1, wherein when the electronic device rotates, the controller is configured to change the first screen to the second screen rotated from the first screen, according to a rotation of the electronic device, if the grip pattern of the electronic device changes.

5. The electronic device of claim 1, wherein if the electronic device is gripped according to a predetermined grip pattern, the controller is configured to execute a predetermined function.

6. The electronic device of claim 1, wherein if a specific grip pattern is sensed whenever a function is executed, the controller is configured to generate a function execution command according to the specific grip pattern.

7. The electronic device of claim 1, wherein when the electronic device is in a locked state, the controller is configured to unlock the electronic device according to a predetermined grip pattern.

8. The electronic device of claim 1, wherein when the electronic device is in a power-off state, the controller is configured to power on the electronic device according to the time period for which a predetermined grip pattern is maintained.

9. The electronic device of claim 1, wherein if a predetermined input is sensed on the grip area when the electronic device has been gripped, the controller is configured to control at least one of volume-up/down of a speaker and zoom-in/out of a camera.

10. The electronic device of claim 1, further comprising a touch screen, wherein the controller is configured to determine whether the electronic device has been gripped if a touch input is sensed on the touch screen, and to ignore the touch input if it is determined that the electronic device has been gripped.

11. The electronic device of claim 1, wherein if a touch input is sensed on the touch screen when the electronic device has been gripped, the controller is configured to determine whether the touch input is made by a palm, and to ignore the touch input if it is determined that the touch input is made by the palm.

12. A method of controlling an electronic device using grip sensing, the method comprising:
    determining a grip pattern on the electronic device; and
    controlling a predetermined function according to the grip pattern and a time period for which the grip pattern is maintained,
    wherein the determining the grip pattern includes sensing at least one touch and at least one pressure on at least two different lateral sides of the electronic device and determining the grip pattern on the at least two different lateral sides of the electronic device based on the sensed at least one touch and the sensed at least one pressure on the at least two different lateral sides of the electronic device, and
    wherein the controlling includes changing a first screen to a second screen rotated from the first screen, based on a change of the grip pattern.

13. The method of claim 12, wherein controlling the predetermined function according to the grip pattern comprises:
    determining the grip pattern if the electronic device senses rotation; and
    maintaining displaying of the first screen if the grip pattern does not change.

14. The method of claim 12, wherein controlling the predetermined function according to the grip pattern comprises:
    determining the grip pattern if the electronic device senses rotation; and
    changing the first screen to the second screen rotated from the first screen, according to the rotation of the electronic device, if the grip pattern changes.

15. The method of claim 12, wherein controlling the predetermined function according to the grip pattern comprises:
    determining whether the grip pattern is a predetermined grip pattern; and
    executing a predetermined function if it is determined that the electronic device is gripped according to the predetermined grip pattern.

16. The method of claim 12, wherein controlling the predetermined function according to the grip pattern comprises:
    determining whether a specific grip pattern is sensed whenever a function is executed; and
    generating a function execution command according to the specific grip pattern if it is determined that the specific grip pattern is sensed whenever the function is executed.

17. The method of claim 12, wherein controlling the predetermined function according to the grip pattern comprises:
    determining the grip pattern when the electronic device is in a locked state; and
    unlocking the electronic device according to the grip pattern.

18. The method of claim 12, wherein controlling the predetermined function according to the grip pattern comprises:
    when the electronic device is in a power-off state, powering on the electronic device according to the time period for which the grip pattern is maintained.

19. The method of claim 12, wherein controlling the predetermined function according to the grip pattern comprises:
    determining whether a predetermined input is sensed on a grip area, when the electronic device has been gripped; and
    controlling at least one of volume-up/down of a speaker and zoom-in/out of a camera, if it is determined that the predetermined input is sensed on the grip area.

20. The method of claim 12, wherein controlling the predetermined function according to the grip pattern comprises:
    determines whether a touch input is sensed on a touch screen of the electronic device;
    determining whether the electronic device has been gripped, if it is determined that the touch input is sensed on the touch screen; and
    ignoring the touch input if it is determined that the electronic device has been gripped.

21. The method of claim 12, wherein controlling the predetermined function according to the grip pattern comprises:
    determining whether a touch input is sensed on a touch screen of the electronic device, when the electronic device has been gripped;
    determining whether the touch input is made by a palm, if it is determined that the touch input is sensed on the touch screen; and
    ignoring the touch input if it is determined that the touch input is made by the palm.

* * * * *